Nov. 9, 1971  H. G. NASON  3,618,231
EDUCATIONAL GAME
Filed June 3, 1970  2 Sheets-Sheet 1
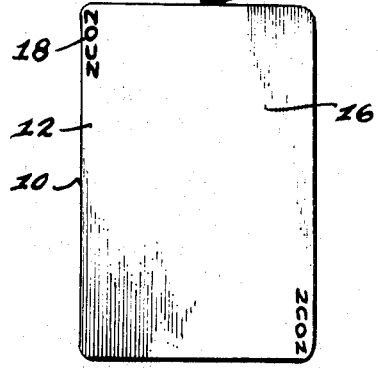
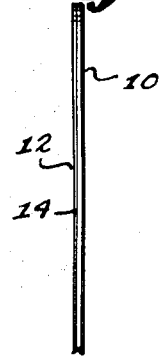
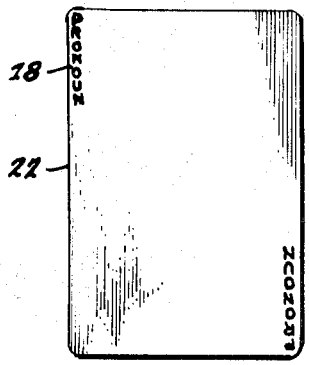
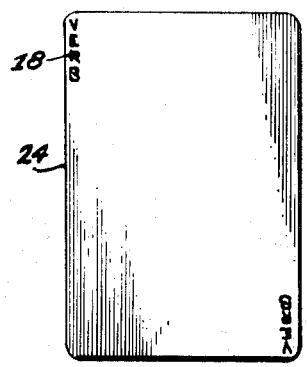
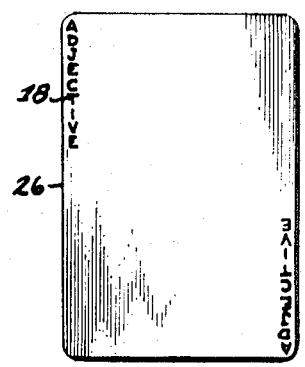
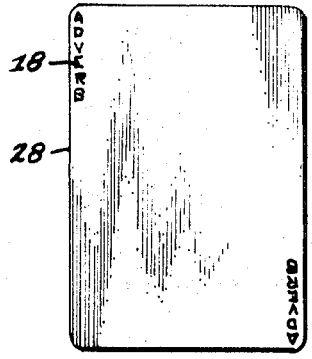
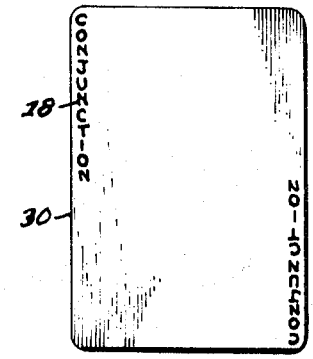
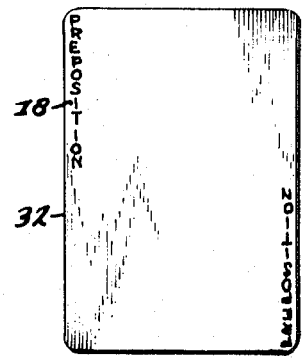
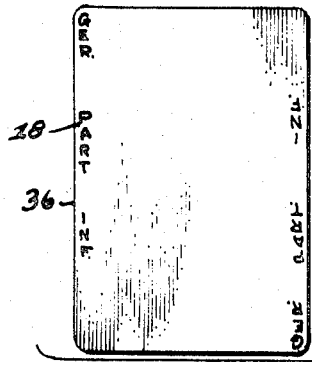
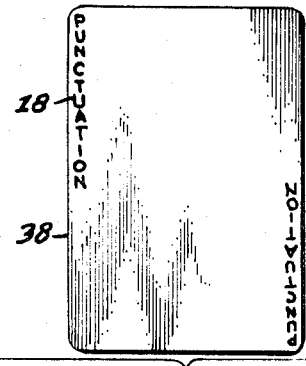
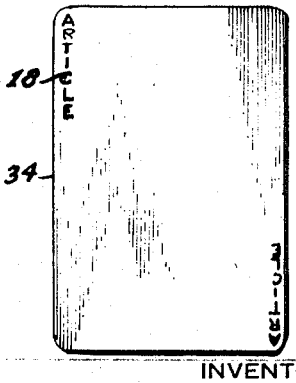
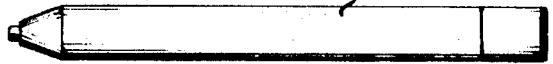
INVENTOR
HELEN G. NASON
BY
Richards & Shefte
ATTORNEYS Nov. 9, 1971    H. G. NASON    3,618,231
EDUCATIONAL GAME Filed June 3, 1970    2 Sheets-Sheet 2

INVENTOR
HELEN G. NASON
BY
Richards & Shefte
ATTORNEYS

United States Patent Office 3,618,231
Patented Nov. 9, 1971

3,618,231
EDUCATIONAL GAME
Helen G. Nason, 615 E. Broad St.,
Statesville, N.C. 28677
Filed June 3, 1970, Ser. No. 43,139
Int. Cl. G09b 19/00
U.S. Cl. 35—35 J
13 Claims

ABSTRACT OF THE DISCLOSURE

An educational sentence building game for teaching grammar with a deck of cards, each card having a plastic coated writing surface on which is displayed the name of a part of speech or the word "punctuation," and is otherwise substantially blank. A marking instrument, such as a grease pencil, and preferably a different colored marking instrument for each player, is provided for erasably marking on the writing surface of each card as it is selectively played a word that is the same part of speech as displayed thereon or a punctuation mark in the case of the cards on which the word "punctuation" is displayed. The game is played by players in turn selecting a card and writing a word or punctuation mark thereon in accordance with the part of speech or word "punctuation" displayed thereon, and playing the card in relation to previously played cards to build or complete a grammatically correct sentence.

BACKGROUND OF THE INVENTION

The present invention relates to the teaching of grammar by the use of a game that provides an entertaining challenge to the student while teaching him fundamental grammatical knowledge and allowing him to practice his skill at a level commensurate with his knowledge.

The teaching of grammar by conventional methods has always been a problem because many students, especially those who are least proficient and, therefore, need instruction the most, find it tedious and unappealing. To increase the interest and attention span of students, various card games have been devised to teach grammar. For example, Trager U.S. Pat. No. 3,482,333, issued Dec. 9, 1969, for Pack of Cards for Sentence Building Game discloses a deck of cards having words printed thereon and being coded by colors and symbols according to the part of speech of the word. The game is played by matching colors or symbols of adjacent portions of adjacent cards until a complete sentence has been formed. However, as the words are printed on the cards the player does not have the opportunity to select words from his own knowledge and, therefore, cannot practice selection of words to suit a part of speech. Moreover, as the cards are coded for matching with other cards without the name of the part of speech actually appearing on the same face of the card as the word, a player can build a sentence simply by code matching without actually knowing the part of speech of the word appearing on the card played and without independently having to determine the proper sentential location of the word in relation to its part of speech. Thus, although the game teaches sentence building, it does not teach independent word selection in relation to parts of speech and it does not directly teach the sentential relationship of parts of speech.

Another example of a prior art grammar game using cards is disclosed in Holland U.S. Pat. No. 3,389,480, issued June 25, 1968, for Game and Teaching Method, which also uses cards with words printed thereon and color coded according to the parts of speech of the words. The game of this Holland patent is played by each player selecting a card with a printed word thereon that he thinks will make sense with the words on previously played cards to add to the forming of a sentence, but he is not required to select words independently from his own knowledge and he need not know the part of speech of the word on a card.

In both the aforementioned Trager and Holland patents the name of the part of speech may be printed on the opposite face of the card, which allows the players, if they so desire, to analyze the grammatical syntax after a sentence has been formed, but this does not impose on the players the requirement of recognizing the necessary part of speech of words as the sentence is being composed.

In contrast, the game of the present invention requires the players to select words from their own knowledge and to determine the proper part of speech of each selected word before placing each selected word in proper sentential relationship with the words on the cards previously played. Thus, the game of the present invention provides a complete grammar drill, and does so in the form of a game that is interesting and competitively challenging.

SUMMARY OF THE INVENTION

Basically, the present invention is an educational game played with a deck of cards. Each card has a face formed as an erasable writing surface that is substantially blank and that has the name of a part of speech displayed thereon, with the part of speech being different on at least some of the cards. The game also includes means for erasably marking on the writing surface of the cards.

The purpose of the game is to build grammatically complete sentences by the players selecting words from their own knowledge and determining the proper part of speech of the selected words. In playing the game, cards are first distributed to each player, the first player then selects one of his cards and writes on the card with the marking means a word that is the same part of speech as that named on the card. This card is then placed in a common playing area as the first word in the building of a sentence. Play continues by each player in turn selecting, if he can, one of his cards having a part of speech named thereon that will combine with the previously played card or cards to add to or complete the building of a sentence, writing on the selected card with the marking means a word that is the same part of speech as that named on the selected card, and placing the card in the playing area in sentential relation to the previously played card or cards.

In the preferred embodiment of the present invention the writing surfaces of the cards are plastic coated and the marking means consists of a plurality of differently colored grease pencils, with each player using a different colored grease pencil to identify his played cards for scoring purposes upon completion of the game. Also, some cards have the word "punctuation" displayed thereon for use by the players in adding punctuation marks during the building of sentences.

BRIEF DESCRIPTION OF THE DRAWINGS

FIG. 1 is a plan view of the obverse face of one of the cards of the educational game of the present invention;

FIG. 2 is a plan view of the reverse face of the card of FIG. 1;

FIG. 3 is an edge view of the card of FIGS. 1 and 2 shown in an exaggerated thickness for purposes of illustration;

FIG. 4 is a plan view of a set of cards similar to the card shown in FIG. 1 and showing different names of parts of speech and the word "punctuation" displayed on different cards;

FIG. 5 is a plan view of a grease pencil used for marking on the writing surfaces of the cards of the preceding figures.

DESCRIPTION OF THE PREFERRED EMBODIMENTS

Figure 6:
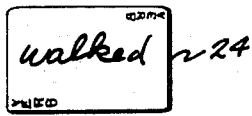
FIGS. 6–11 illustrate the sequential playing of cards, on which words or punctuations marks are written, to build a complete sentence in playing the game of the present invention.

In the illustrated embodiment the educational game of the present invention uses a deck of cards, which for convenience may be of the same general shape and size as conventional rectangular playing cards. A typical card 10 is illustrated in FIGS. 1–3, and is seen to have an obverse face 12 that is formed with a plastic coating thereon. This plastic coating is indicated by the numeral 14 in FIG. 3, which is an edge view of the card 10 showing the thickness of the card and coating greatly exaggerated for illustrative purposes. Alternatively, the card may be plastic throughout with the outer surface thereof providing the erasable writing surface. The obverse face 12 with the plastic coating 14 thereon forms an erasable writing surface 16 that has the name of a part of speech displayed thereon, as indicated at 18, closely adjacent opposite side edges thereof, thereby leaving the overall writing surface 16, and particularly its central portion, substantially blank. Preferably the name 18 of the part of speech is printed on the obverse face 12 of the card 10 during manufacture.

The reverse face 20 (FIG. 2) of the card 10 is either blank or embellished by some design or picture that is identical on all cards of the deck so that players cannot tell what parts of speech are named on the cards of other players. As seen in FIG. 1, the name 18 of the part of speech displayed thereon is the word "noun." This same name appears on several of the cards of the deck while the name of the part of speech is different on at least some of the other cards of the deck. For example, in FIG. 4 the names 18 of the parts of speech displayed on seven different cards 22, 24, 26, 28, 30, 32, and 34 are "pronoun," "verb," "adjective," "adverb," "conjunction," "preposition," and "article," respectively, while another card 36 has displayed thereon the abbreviations "ger. part. inf." for gerund, participle, and infinitive parts of speech. An additional card 38 has the word "punctuation" displayed thereon in place of the name of a part of speech.

The game of the present invention may be played with a deck of cards containing cards of all ten types shown in FIGS. 1 and 4, or a lesser number of types of cards may be used to play a simplified version. For example, the "ger. part. inf." cards 36 and the "punctuation" cards 38 may be omitted. Other types of cards could also be omitted, although it is preferable that a sufficient number of types of cards be used to provide the necessary parts of speech to form at least a simple complete sentence.

Included as part of the game of the present invention is means for erasably marking on the writing surfaces 16 of the cards 10 and 22–38. Preferably this marking means comprises a plurality of differently colored marking instruments for marking on the writing surfaces 16 of the cards in different colors. In the illustrated embodiment the marking instrument is in the form of a conventional grease pencil 40 (FIG. 5), which could also be a water base pen. In playing the game, there are preferably at least two writing instruments for writing in different colors. For example, one grease pencil would be provided for writing in one color, such as red, and another grease pencil would be provided for writing in another color, such as green. This allows the players in a two player or two team game to identify the cards that they have written on for scoring purposes at the end of play. Additional differently colored grease pencils may be included where the game is played by more than two players or teams.

The game may be played by two or more players using a deck of forty cards consisting of four cards of each of the ten types shown on FIGS. 1 and 4. If there are four or more players, a double deck may be used. In a simplified version for players having only a limited knowledge of grammar, the punctuation cards 38 and the "ger. part. inf." cards 36 may be omitted, leaving a deck of thirty-six cards.

Grease pencils 40 are provided for the use of the players, preferably with each player having a grease pencil and each pencil being of a different color for an individually scored game or with the colors of the pencils of the players on the same team being the same for a team scored game.

Also, cotton pads, soft flannel cloths or some other means are used with the game for erasing the words or punctuation marks from the cards at the end of each game. When using water base pens, dampened paper towels or wet cloths could be used for this purpose.

The game is played by first distributing all of the cards in the deck to the players. The first player then selects one of the cards previously distributed to him, other than a punctuation card 38, and writes on the writing surface 16 of the selected card with his grease pencil 40 a word that is the same part of speech as named on the card. He then plays this card in a common playing area with the obverse face 12 on which the word is written being exposed to the view of all of the other players. Play continues by each player in turn selecting, if he can, one of the cards previously distributed to him having a part of speech named thereon that will combine with the previously played card or cards to add to or complete the building of a sentence, writing on the writing surface 16 of the selected card with his grease pencil 40 a word that is the same part of speech as named on the card and that will make sense with the words on the previously played card or cards, and placing the card in the playing area in sentential relation to the previously played card or cards. When punctuation cards 38 are included in the deck, a player other than the first player may during his turn select one of these cards, if he has been dealt one, write a punctuation mark thereon that would be grammatically proper in the sentence being built by the previously played cards, and place the marked card in the playing area in proper sentential relation to the previously played cards. If the words on the previously played cards form a grammatically complete sentence, a period, exclamation mark, or question mark may be written on a punctuation card 38 and the card played at the end of the previously played cards to end the building of the sentence. After a sentence has been so completed, no further cards may be played on that sentence, and subsequent players may then play their cards to build another sentence or sentences. Also, should a player be unable to add to an incomplete sentence, he may play a card to start another sentence, but the scoring is such that it is preferable to build on an incomplete sentence rather than start a new sentence.

Also, during play it may become necessary to change the part of speech of a previously played word to suit its relationship to the word on a newly played card, in which case a player strikes through the name of the original part of speech and writes in the name of the proper part of speech. This aspect of the game of the present invention teaches changes in the parts of speech of words during composition of sentences.

Figure 7:
Figure 8:
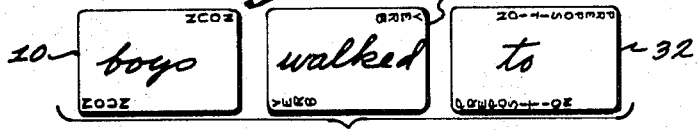
Figure 9:
Figure 10:
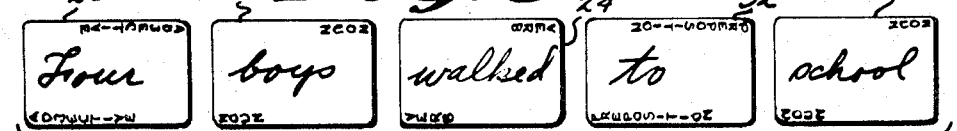
Figure 11:
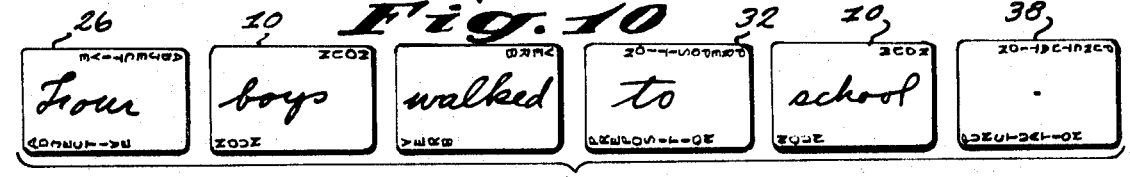

An example of progressive development of a sentence in playing the game of the preferred embodiment is illustrated in FIGS. 6–11. Assuming for the purpose of illustration that there are two players, the first player placed a VERB card 24 in the playing area after writing the verb "walked" thereon (FIG. 6) in red. The second player followed by selecting a NOUN card 10, writing the noun "boys" thereon in green, and placing it in front of the previously played card (FIG. 7). The first player then selected a PREPOSITION card 32, wrote the preposition "to" on it in red and played it at the end of the previously played cards (FIG. 8). The second player followed by selecting an ADJECTIVE card 26, writing the adjective "Four" thereon in green, and playing it in front of the previously played cards (FIG. 9). The first player then selected a NOUN card 10, wrote the noun "school" thereon in red, and played it at the end of the previously played cards (FIG. 10). Finally, the second player, recognizing that a complete sentence had been built, selected a PUNCTUATION card 38, marked it with a period in green, and placed it at the end of the previously played cards (FIG. 11). At this point no further cards could be played on this first sentence, and play continued by starting a new sentence.

During the building of a sentence, a player may add a card between previously played cards rather than in front or at the end. For example, in the illustrated sentence an ADVERB card 28 could have been inserted between the VERB card 24 and the second NOUN card 10 with the adverb "quickly" written on it, making the sentence read: "Four boys walked quickly to school."

The game ends when one player has used all of his cards, when no player can play, when a predetermined number of sentences have been completed, when a time limit has expired, or when some other agreed upon condition exists. The scores of the players are then determined by assigning points for the cards that have been played and assigning penalties for errors. The following is an example of a representative scoring system:

POSITIVE POINTS

A card, other than a PUNCTUATION card, played—

On the first sentence _____ 25
On the second sentence _____ 20
On the third sentence _____ 15
On the fourth sentence _____ 10
On the fifth sentence _____ 5

A PUNCTUATION card played with the following punctuation mark written thereon—

Comma _____ 10
Colon or semi-colon _____ 25
Period, exclamation mark or question mark that completes any sentence _____ 50

PENALTY POINTS

An incorrectly played PUNCTUATION card _____ 50
Failure to use necessary punctuation _____ 10
Misspelled word _____ 10

The foregoing scoring system, as well as the rules, may, of course, be varied in any desired manner, and the method of play can also be varied. For example, the building of a sentence could be allowed to continue after a period has been played, either without penalty or with a reduced point count.

After a game has been played and the points of the played cards determined, the grease pencil markings on the cards are erased by wiping with the aforementioned cotton pads, flannel cloths, or other means provided for that purpose. The cards are then in condition for playing the next game.

From the foregoing, it is apparent that the game of the present invention provides a complete grammar drill in a manner that is interesting and competitively challenging. Not only is the player drilled in the knowledge and usage of parts of speech but he is also drilled in the selection of words in relation to parts of speech, and must be able to defend his selection if challenged. Thus, in playing the game the player must know what part of speech to use so that he can select a proper card to play and he must be able to select words from his own knowledge that are parts of speech appropriate for the intended use in the sentence being built. If a player has several unplayed cards, he may first think of a word that would seem to make sense in the sentence being built, he then must determine what part of speech that word is and then select a corresponding card. If the player has only one or a few unplayed cards, he may first attempt to determine if and where a particular part of speech named on one of his remaining cards would fit in the syntax of the sentence being built, he then must choose a word from his own knowledge that is the same part of speech as that named on the card. In any event, in playing the game a player must determine both a word and a part of speech, as well as a proper sentential relation.

Furthermore, the game may be played at varying levels of skill so that players may use the game to practice their grammar skill at a level commensurate with their knowledge. In this regard, the players are allowed to select words from their own knowledge, and the game may be played in simplified versions by omitting the more difficult parts of speech, such as gerunds, participles, and infinitives, and by omitting punctuation. In a more advanced version, sentence building can be carried forward to teach the building of paragraphs.

Also, it should be recognized that the game of the present invention may be adapted to use in teaching grammar in foreign languages simply by providing cards with foreign language parts of speech.

The foregoing detailed description of the preferred embodiment of the present invention has been provided for the purpose of illustration only and is not intended as a limitation of the scope of the present invention, which is capable of variation and modification, being limited only by the scope of the appended claims.

I claim:

1. An educaitonal game comprising a deck of playing cards, each card having a face formed as an erasable writing surface, said face being substantially blank and having the name of a part of speech displayed thereon, the part of speech being different on at least some of said cards, and means for erasably marking on said writing surface.

2. An educational game according to claim 1 and characterized further in that said name of a part of speech is displayed on each said card adjacent the edge of said face and the entire central portion of said face is blank for marking thereof by said marking means.

3. An educational game according to claim 1 and characterized further in that the different parts of speech named on said cards are sufficient to provide the parts of speech necessary to form a complete sentence.

4. An educational game according to claim 1 and characterized further in that said marking means comprises a plurality of differently colored marking instruments for marking on said writing surface in different colors.

5. An educational game according to claim 1 and characterized further in that the other faces of all of said cards are identical.

6. An educational game according to claim 1 and characterized further in that said writing surface of each card comprises a plastic coating on said face.

7. An educational game according to claim 6 and characterized further in that said marking means is a grease pencil.

8. An educational game according to claim 6 and characterized further in that said marking means comprises a plurality of differently colored grease pencils.

9. An educational game according to claim 1 and characterized further in that additional cards are included with the word "punctuation" displayed thereon.

10. A method of playing an educational game having a marking instrument and a plurality of playing cards, each said card having a substantially blank face on which is displayed the name of a part of speech that is different on at least some of said cards, said method comprising the steps of distributing said cards to the players, a first player selecting one of the cards previously distributed to him, writing on the face thereof with said marking instrument a word that is the same part of speech as named thereon, and placing said card in a common playing area, continuing the play by each player in turn selecting, if he can, one of the cards previously distributed to him having a part of speech named thereon that will combine with the previously played card or cards to add to or complete the building of a sentence, writing on the face of the selected card with said marking instrument a word that is the same part of speech as named thereon, and placing it in said playing area in sentential relation to the previously played card or cards.

11. A method of playing an educational game according to claim 10 and characterized further in that any player who is unable to add to or complete a sentence by adding a card to the previously played card or cards may play a card to start another sentence.

12. A method of playing an educational game according to claim 10 wherein additional cards are included with the word "punctuation" displayed thereon and characterized further in that a player during his turn may select one of said additional cards, mark with said marking instrument a punctuation mark thereon, and place it in said playing area in sentential relation to the previously played card or cards.

13. A method of playing an educational game according to claim 12 and characterized further in that the playing of one of said additional cards on which a player has marked a period completes the building of the sentence in which said additional card is played, and subsequent players play cards to build or complete sentences other than that completed by the playing of said additional card.

References Cited

UNITED STATES PATENTS

| | | | |
|---|---|---|---|
| 577,345 | 2/1897 | Benjamin | 273—152.44 |
| 3,389,480 | 6/1968 | Holland | 35—35 J |
| 3,482,333 | 12/1969 | Trager Jr. | 35—35 J |

FOREIGN PATENTS

| | | |
|---|---|---|
| 14,484 | 7/1888 | Great Britain. |

ROBERT W. MICHELL, Primary Examiner

L. ANTEN, Assistant Examiner

U.S. Cl. X.R.

273—152.44, 157.7 A